US005117634A

United States Patent [19]

Marian et al.

[11] Patent Number: 5,117,634

[45] Date of Patent: Jun. 2, 1992

[54] APPARATUS FOR CONTROLLING THE OPERATION OF HYDRAULIC MOTORS

[75] Inventors: Alfred Marian, Herdecke-Ruhr; Mathias Szewczyk, Witten, both of Fed. Rep. of Germany

[73] Assignee: Paul Pleiger Maschinenfabrik GmbH & Co. KG, Fed. Rep. of Germany

[21] Appl. No.: 771,512

[22] Filed: Oct. 1, 1991

Related U.S. Application Data

[63] Continuation of Ser. No. 493,930, Mar. 15, 1990, abandoned.

[30] Foreign Application Priority Data

Apr. 3, 1989 [DE] Fed. Rep. of Germany ....... 3910728

[51] Int. Cl.$^5$ .............................................. F16D 31/02

[52] U.S. Cl. ........................................ 60/445; 60/459; 60/450; 60/451; 60/489; 91/497; 91/498

[58] Field of Search .................... 91/497, 498; 60/450, 60/451, 459, 462, 489

[56] References Cited

U.S. PATENT DOCUMENTS 2,550,966 5/1951 Buchanan ......................... 91/497 X
3,744,379 7/1973 Freeman .............................. 91/497
3,987,624 10/1976 Cooke et al. ..................... 60/450 X
4,103,489 8/1978 Fletcher et al. ................. 60/451 X
4,185,540 1/1980 Nonnenmacher et al. ........... 91/497
4,325,215 4/1982 Yamamoto ............................ 60/450
4,404,896 9/1983 Allart et al. ....................... 91/497 X
4,474,104 10/1984 Creffield .............................. 91/497
4,710,106 12/1987 Iwata et al. ........................ 60/459 X
4,768,340 9/1988 Hamilton ........................... 60/451 X
4,949,541 8/1990 de Vietro ........................... 60/489 X

*Primary Examiner*—Edward K. Look
*Assistant Examiner*—Todd Mattingly
*Attorney, Agent, or Firm*—Wood, Phillips, VanSanten, Hoffman & Ertel

[57] ABSTRACT

In an apparatus for controlling the operation of hydraulic motors having infinitely adjustable eccentricity, wherein a flow-control valve between a pump and a hydraulic motor supplied with pressure medium and a control valve for adjusting the eccentricity of the hydraulic motor as a function of the operating pressure required by the hydraulic motor are provided, in connection with pressure optimization for keeping constant the torque of the hydraulic motor, the hydraulic motor is provided with a regulating device (7,10) which is mechanically connected to the eccentric (3) and transmits an eccentric adjustment outward, wherein this mechanical regulating device (7,10) acts on the flow-control valve (17) in such a way that, as a function of the change in the eccentricity, the flow-control valve (17) controls the pressure-medium quantity supplied to the hydraulic motor in such a way that the speed of the hydraulic motor is kept constant.

6 Claims, 3 Drawing Sheets

APPARATUS FOR CONTROLLING THE OPERATION OF HYDRAULIC MOTORS

This application is a continuation of application Ser. No. 493,930, filed Mar. 15, 1990, now abandoned.

The invention relates to an apparatus for controlling the operation of hydraulic motors according to the preamble of claim 1.

German Offenlegungsschrift 3,313,974 discloses an apparatus of this type, in which arrangement, if the torque demanded from the hydraulic motor changes, the eccentricity of the motor, by means of the control valve, is adjusted in such a way that, to avoid power losses, the pressure behind the flow-control valve or the pressure present at the motor is kept constant within narrow limits. By the change in eccentricity and thus in the capacity of the motor, the speed of the motor is also changed if the pressure-medium flow supplied remains the same. But in some fields of application of hydraulic motors it is desirable to keep the motor speed constant even when torque changes.

The object of the invention is to design an apparatus of the type specified at the beginning in such a way that, despite pressure optimization, the speed of the hydraulic motor can be kept constant when torque changes, in which arrangement the apparatus is to have a simple construction.

This object is achieved according to the invention by the features in the defining part of claim 1. By the eccentric adjustment being transmitted mechanically to the flow-control valve, a simple construction of the apparatus results, an appropriate design of the flow-control valve enabling the pressure-medium quantity supplied to the motor to be controlled in such a way that the speed of the motor remains constant and at the same time the pressure difference at the flow-control valve is kept constant.

Advantageous developments of the invention are specified in the description below and in the further claims.

An exemplary embodiment of the invention is described in greater detail below with reference to the drawing, in which.

Figure 1:
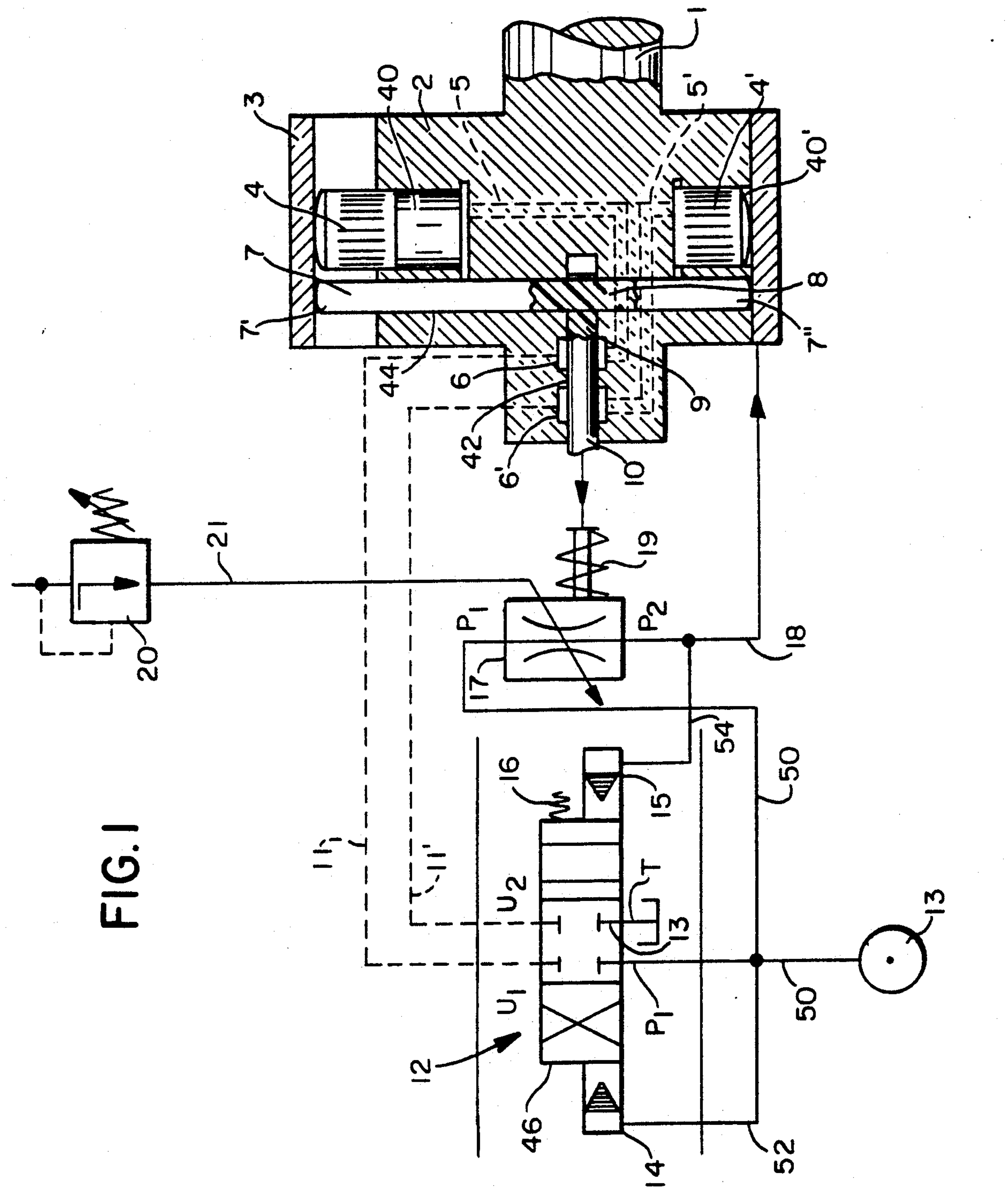
FIG. 1 shows a schematic representation of a hydraulic motor having a control valve and a flow-control valve.

In FIG. 1, a radial piston motor (not shown) has an output shaft 1 with an offset hub 2 having an eccentric ring 3 arranged thereon. A pair of regulating pistons 4 and 4' are guided diametrically opposite one another in radial blind bores 40 and 40' formed in the hub 2. A pair of passages 5 and 5' extend through the hub and connect blind bores 40 and 40', respectively, with annular grooves 6 and 6', respectively formed in an axial bore 42. An elongated control pin 7 is guided for movement within a radial bore 44 formed in the hub 2 and has spaced apart ends 7' and 7'' engaging the eccentric ring 3. A slide 10 is axially movable within bore 42 and has a helical gear tooth system 9 in mesh with a corresponding helical tooth system 8 on control pin 7 such that radial displacement of the control pin through the hub 2 is effective to axially displace slide 10 within bore 42.

A control valve 12 is provided for supplying hydraulic fluid to the motor and has a continuously movable spool 46 which is axially biased by a centering spring 16. Control valve 12 comprises a hydraulically activated 4/3-way valve and is provided on the inlet side with a primary pressure P1 supplied by a hydraulic pump 13. A tank line 48 connects the inlet side with a sump return T. Fluid lines 11 and 11' connect the outlet side of control valve 12 with annular grooves 6 and 6', respectively, and communicate an infinitely variable differential pressure to passages 5 and 5' to displace regulating pistons 4 and 4' and radially shift the annular collar 3 about the motor hub 2.

Pump 13 supplies primary pressure P1 to a flow control valve 17 through a fluid line 50. The flow control valve modulates primary pressure P1 and supplies pressure P2 to the motor through a fluid line 18. Primary pressure P1 is also communicated to an end face 14 of the valve spool 46 by fluid line 52. Pressure P2 is communicated with an opposite end face 15 of valve spool 46 by fluid line 54 to balance the pressure applied at opposite end face 14.

Flow control valve 17 has a spring loaded regulating member 19 which is mechanically coupled with the slide 10 of the hydraulic motor by a rotary cam 40. Regulating member 19 is responsive to axial displacement of slide 10 to control the volume of fluid permitted to flow through valve 17. A pressure limiter valve 20 is presetting the flow control valve to 17 by fluid line 21 for presetting the flow control valve to a desired initial setting.

In the position shown in Figure 1, pump 13 drives the radial piston motor at a constant speed and pressure differential P1–P2 across the flow control valve 17. When the torque requirements of the motor are reduced, for example, by an agitator driven by the motor, operating pressure P2 within fluid line 18 decreases. The reduction in pressure P2 increases the pressure differential across control valve 12 such that the valve spool 46 shifts to vary the fluid pressure within lines 11 and 11'. The fluid pressure in 5 and 5' is correspondingly modulated and varies the position of the regulating pistons 4 and 4', thereby shifting the annular ring 3 relative to hub 2 and decreasing the eccentricity of the radial piston motor. The reduced eccentricity causes a reduced lever action on the ring 3, such that the operating pressure P2 in line 18 increases again to a value which provides the initial pressure differential P1–P2, assuming that the pressure P1 delivered by pump 133 remains constant. In this way, variations in the motor torque requirements actuate the control valve 12 to modulate the motor eccentricity and thereby restore the pressure differential across flow control valve 17 to a constant value to avoid power losses.

Figure 4:
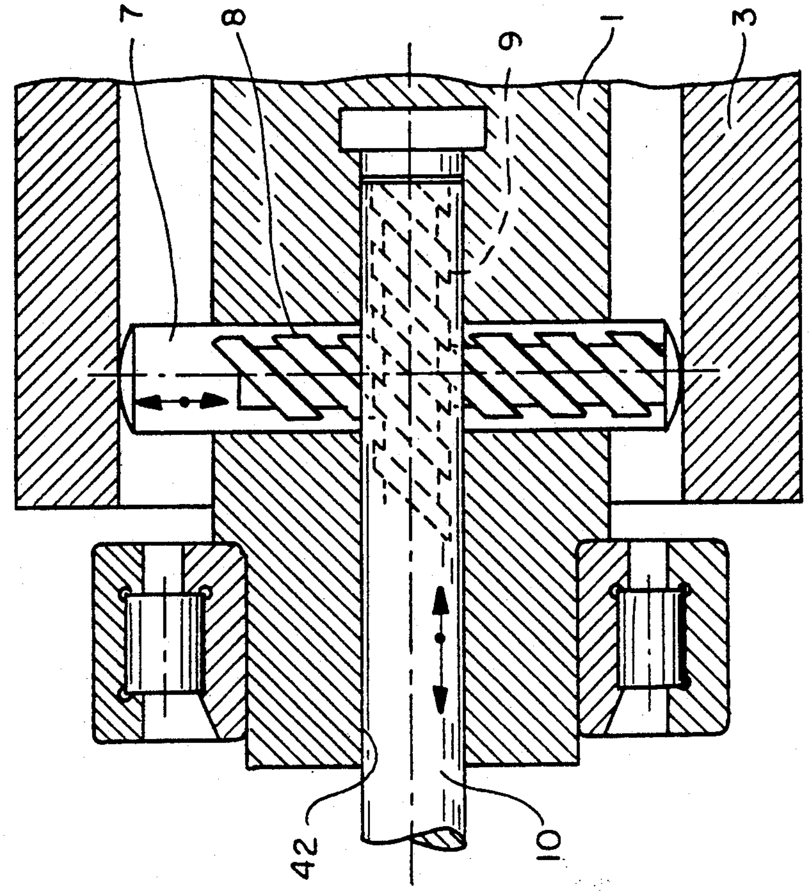
FIG. 4 shows a helical gear tooth system connecting the slide and a radial control pin.
Figure 3:
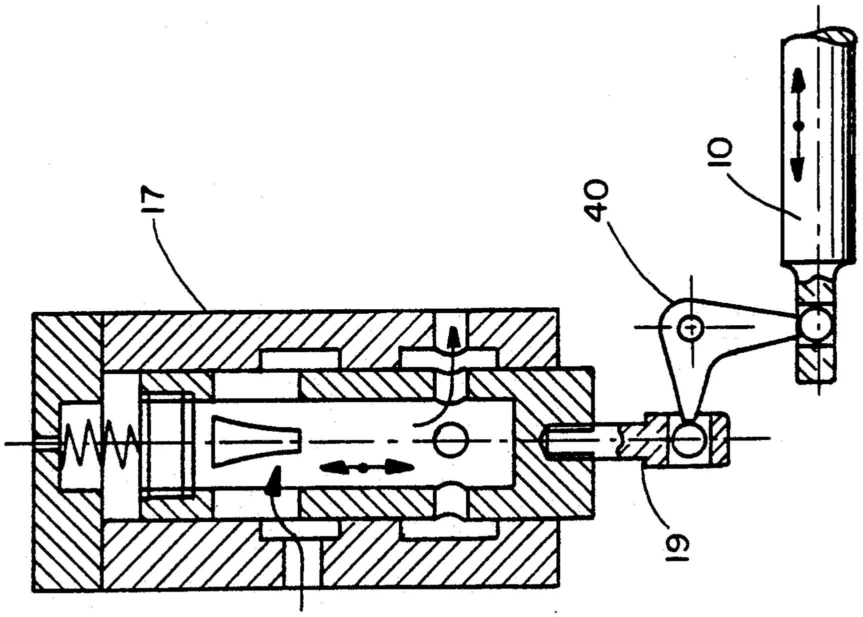
FIG. 3 shows a rotary cam pivotally connected between the flow control valve and an axial slide.

The radial adjustment of the eccentric ring 3 caused by the relative displacement of regulating pistons 4 and 4' results in a restriction of the volume of fluid which is supplied to the motor. As eccentric ring 3 shifts radially, control pin 7 moves through bore 44 in hub 2 with interengaged gear systems 8 and 9 (see FIG. 4) producing an axial displacement of slide 10. If, at reduced eccentricity, and thus reduced capacity of the hydraulic motor, the volume of fluid supplied by the flow control valve 17 were to remain constant, the speed of the motor would be increased. By mechanically coupling flow control valve 17 with the eccentric ring, the flow volume supplied to the hydraulic motor, in the example described above, is reduced in such a way that the speed of the motor remains constant, while at the same time the pressure difference at the flow control valve is kept constant.

In a corresponding manner, if the torque demanded from the motor is increased, operating pressure P2 in fluid line 18 is first increased. Valve spool 46 shifts to modulate the position of regulating pistons 4 and 4' in such a way that the eccentricity of the motor is increased. The eccentric ring then provides increase lever action and pressure P2 in fluid line 18 decreases to maintain a constant pressure differential P1-P2 across flow control valve 17. The slide 10 and regulating member 19 act to increase the volume of flow to the motor such that the motor speed remains constant at increased eccentricity.

By the apparatus described, the hydraulic motor always works at the same speed and optimum operating pressure. In central supply installations, in which a plurality of hydraulic motors are supplied with pressure medium by a pump 13 in each case via a control valve 12 and a flow-control valve 17, a substantial improvement in efficiency is thus achieved, since the individual hydraulic motors, despite different loadings, each work at optimum efficiency. The capacity to be installed in a central supply installation can thereby be designed more advantageously.

Keeping the speed constant while optimizing the pressure by the control valve 12 as described could certainly also be achieved via speed sensors, measurement transducers and such like electronic components, but this would involve substantially greater expense than the mechanical coupling described between eccentric adjustment and flow-control valve 17, which mechanical coupling can be constructed very simply and cost-effectively.

Various modifications of the type of construction described are possible. Thus, for example, instead of the helical tooth system 8, 9 on the control pin 9 and on the slide 10, a cam, an inclined plane or the like can also be provided on one of the two components, while a lifter, stud or the like which interacts with this cam is attached to the other component. A control groove or the like, similar to the schematically shown tooth system, is preferably provided so that, by the adjusting movement of the control pin 7 in both directions, the slide 10 is displaced in both directions without requiring spring loading of the slide 10 in one direction. The slide 10 can be directly coupled to the regulating member 19 of the flow-control valve 17. In the schematically shown embodiment, the regulating member 19 is loaded by a spring in such a way that it is held in contact with the slide 10.

Figure 2:
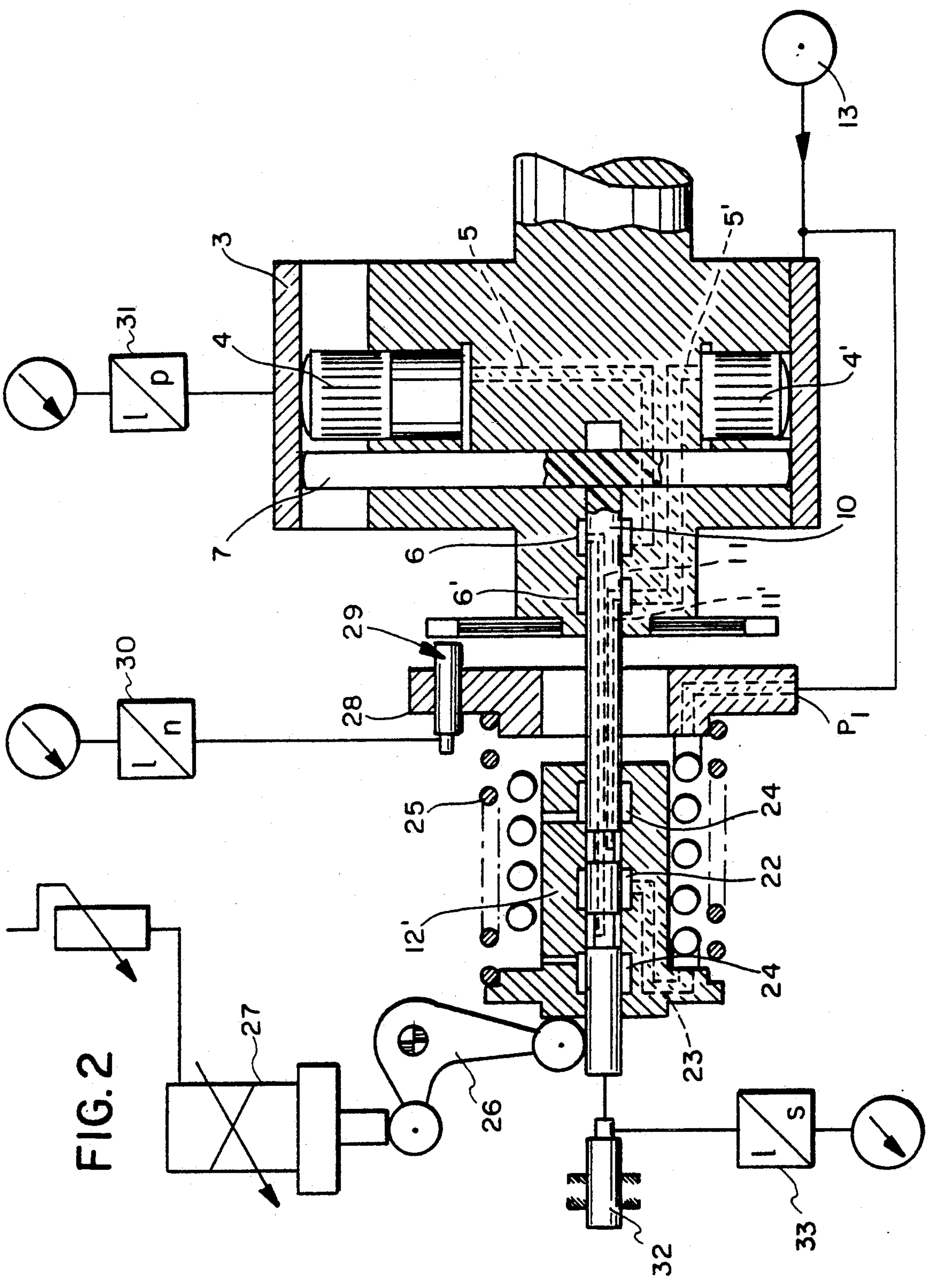
FIG. 2 shows a modified embodiment.

In the embodiment according to FIG. 2, the same reference numerals as in FIG. 1 are used for the same or corresponding components. The pressure-medium lines 5, 5', via the groove 6, 6', are connected to pressure-medium lines 11, 11' which are formed in the slide 10, on whose extension a control valve 12' is arranged which corresponds to the type of construction according to German Offenlegungsschrift 3,818,105. The center groove 22 in the continuous bore of the control valve 12', via a line 23 and a rotary transmission lead-through, is acted upon by the primary pressure P of the pump 13, whereas the grooves 24 correspond to the connection T of the control valve 12 in FIG. 1 and are connected to the atmosphere. The connections $U_1$ and $U_2$ correspond to the ports, arranged offset, of the lines 11, 11' in the slide 10 in the area of these grooves 22, 24.

Bearing against the control valve 12', loaded by a spring 25, is an arm of a pivotably mounted regulating lever 26 whose other arm, with a predetermined lever ratio, is acted upon by a solenoid 27. By pivoting of the regulating lever 26, the control valve 12' is displaced on the slide 10 in such a way that, via a corresponding admission of pressure medium via the lines 11, 11' and the servo pistons 4, 4', the eccentricity is adjusted in such a way that the pressure different $P_1-P_2$ at the flow-control valve (not shown in FIG. 2) is kept constant within narrow limits. The spring 25 is here supported against a schematically indicated component 28 of the motor housing.

The slide 10 projects beyond the end face of the control valve 12' so that this free end of the slide 10, as in the exemplary embodiment in FIG. 1, can act on a regulating member 19 (not shown) of the flow-control valve.

The solenoid 27 can be controlled by appropriate electrical signals in such a way that the adjustment of the eccentricity, which adjustment is required for optimizing the pressure, is carried out when the torque changes. Appropriate regulating-value transmitters are provided for this purpose. Schematically indicated at 29 is a speed sensor which is connected to a unit 30 for processing the actual and required values. A corresponding unit for actual and required values of the operating pressure is designated by 31. 32 indicates a sensor, interacting with the slide 10, for the eccentricity or the capacity of the motor, which sensor 32 is connected to a unit 33 for actual and required values.

According to the invention, the apparatus schematically reproduced in FIG. 2 can also be used for optimizing the pressure during variable speed of the hydraulic motor so that in this case the slide 10 does not act on the flow-control valve via a regulating member 19 for keeping the speed constant

We claim:

1. An apparatus for controlling the operation of a hydraulic motor which is characterized by a motor output speed and a motor output torque, the motor being driven by a first flow of pressure medium and having a radially adjustable eccentric member positionable by a second flow of pressure medium, the position of the eccentric member establishing an eccentricity of the hydraulic motor and influencing the motor output speed, the apparatus comprising:
   - a pump for supplying pressure medium to the hydraulic motor;
   - a flow control valve connected between the pump and the hydraulic motor for controlling the first flow of pressure medium to drive the hydraulic motor;
   - a control valve connected between the pump and the motor for controlling the second flow of pressure medium to the motor to adjust the eccentricity of the hydraulic motor in response to a change in the first flow of pressure medium; and
   - a regulating device mechanically interconnected between the hydraulic motor and the flow control valve and responsive to changes in the motor eccentricity whereby the flow control valve is commanded to control the first flow of pressure medium in such a way that the output speed of the hydraulic motor remains constant while the output torque of the hydraulic motor varies.

2. The apparatus as claimed in claim 1 in which the hydraulic motor has an axial shaft about which the eccentric member is radially adjustable, the shaft having a radial bore extending therethrough to define diametrically opposed openings on the shaft adjacent an inner periphery of the eccentric member, the regulating device including a control pin guided for radial movement through the bore and having spaced ends engageable with the inner periphery of the eccentric member, whereby adjustment of the eccentric member the control pin advances radially through the bore, and an axially guided slide mechanically coupled with the control pin and operative to control the flow control valve in response to a radial displacement of the control pin.

3. The apparatus as claimed in claim 2 in which the control pin is mechanically coupled ;with the slide by a plurality of engaged helical gear teeth.

4. The apparatus as claimed din claim 2 in which the slide by is mechanically connected with a movable flow regulating member on the flow control valve by a rotary cam, such that axial displacement of the slide varies the position of the flow regulating member to modulate the first flow of pressure medium.

5. The apparatus as claimed in claim 1 including means for presetting the first flow of pressure medium to the hydraulic motor.

6. The apparatus as claimed in claim 2 in which the slide extends through the control valve and has a pair of axial passages for supplying the second flow of pressure medium to vary the eccentricity of the hydraulic motor, the control valve being acted upon by an electrically or mechanically actuated regulating element.

* * * * *